(12) United States Patent
Floman et al.

(10) Patent No.: US 7,430,625 B2
(45) Date of Patent: Sep. 30, 2008

(54) CONNECTION OF A MEMORY COMPONENT TO AN ELECTRONIC DEVICE VIA A CONNECTION BUS UTILIZING MULTIPLE INTERFACE PROTOCOLS

(75) Inventors: Matti Floman, Kangasala (FI); Kimmo Mylly, Julkujärvi (FI)

(73) Assignee: Spyder Navigations L.L.C., Wilmington, DE (US)

( * ) Notice: Subject to any disclaimer, the term of this patent is extended or adjusted under 35 U.S.C. 154(b) by 0 days.

(21) Appl. No.: 10/851,465

(22) Filed: May 21, 2004

(65) Prior Publication Data
US 2004/0268077 A1 Dec. 30, 2004

(30) Foreign Application Priority Data
May 22, 2003 (FI) .................. 20035072

(51) Int. Cl.
*G06F 3/00* (2006.01)
*G06F 13/00* (2006.01)
*H05K 1/14* (2006.01)

(52) U.S. Cl. .......... 710/104; 710/301; 710/11; 710/15

(58) Field of Classification Search .......... 710/104, 710/105, 62
See application file for complete search history.

(56) References Cited

U.S. PATENT DOCUMENTS

| | | | | |
|---|---|---|---|---|
| 5,581,708 A | * | 12/1996 | Iijima | 710/11 |
| 5,651,116 A | | 7/1997 | Le Roux | |
| 6,138,180 A | * | 10/2000 | Zegelin | 710/11 |
| 6,213,392 B1 | * | 4/2001 | Zuppicich | 235/380 |
| 6,557,754 B2 | * | 5/2003 | Gray et al. | 235/375 |
| 6,614,685 B2 | * | 9/2003 | Wong | 365/185.11 |
| 6,820,148 B1 | * | 11/2004 | Cedar et al. | 710/104 |
| 6,832,281 B2 | * | 12/2004 | Jones et al. | 710/301 |
| 6,842,818 B2 | * | 1/2005 | Okamoto et al. | 710/307 |
| 6,843,423 B2 | * | 1/2005 | Fruhauf et al. | 235/492 |

(Continued)

FOREIGN PATENT DOCUMENTS

WO 0196990 12/2001

OTHER PUBLICATIONS

CompactFlash—retrieved from http://en.wikipedia.org/wiki/CompactFlash—retrieved on Jun. 19, 2007—6 pages.*
Secure Digital card—retrieved from http://en.wikipedia.org/wiki/Secure_Digital_card—retrieved on Jun. 19, 2007—12 pages.*
MultiMediaCard—retrieved from http://en.wikipedia.org/wiki/Multimedia_Card—retrieved on Jun. 19, 2007—4 pages.*

*Primary Examiner*—Paul R. Myers
*Assistant Examiner*—Brian T Misiura
(74) *Attorney, Agent, or Firm*—Connolly Bove Lodge & Hutz LLP

(57) ABSTRACT

The present invention relates to a method for connecting a memory component to an electronic device by a connection bus. At least a first interface protocol and a second interface protocol are available on the connection bus, wherein the memory component is recognized. On the basis of the recognition, it is determined, if the first interface protocol or said second interface protocol are available in the memory component, wherein on the basis of the recognition, one of the protocols available in the memory component is selected for use on the connection bus. The invention also relates to a system, in which the method is applied, as well as an electronic device, and a bus connection.

22 Claims, 4 Drawing Sheets

U.S. PATENT DOCUMENTS

| | | | |
|---|---|---|---|
| 6,901,457 B1 * | 5/2005 | Toombs et al. | 710/11 |
| 6,913,196 B2 * | 7/2005 | Morrow et al. | 235/451 |
| 6,973,519 B1 * | 12/2005 | Estakhri et al. | 710/104 |
| 7,028,127 B2 * | 4/2006 | Kang et al. | 710/303 |
| 7,061,804 B2 * | 6/2006 | Chun et al. | 365/185.17 |
| 7,095,618 B1 * | 8/2006 | Mambakkam et al. | 361/737 |
| 7,111,085 B2 * | 9/2006 | Estakhri et al. | 710/15 |
| 7,222,205 B2 * | 5/2007 | Jones et al. | 710/301 |
| 7,254,650 B2 * | 8/2007 | Lin et al. | 710/11 |
| 2001/0000405 A1 * | 4/2001 | Gray et al. | 235/375 |
| 2001/0038547 A1 * | 11/2001 | Jigour et al. | 365/43 |
| 2002/0046342 A1 | 4/2002 | Elteto et al. | |
| 2003/0028797 A1 | 2/2003 | Long et al. | |
| 2003/0233501 A1 * | 12/2003 | Ma et al. | 710/62 |
| 2005/0182881 A1 * | 8/2005 | Chou et al. | 710/301 |

* cited by examiner

CONNECTION OF A MEMORY COMPONENT TO AN ELECTRONIC DEVICE VIA A CONNECTION BUS UTILIZING MULTIPLE INTERFACE PROTOCOLS

CROSS-REFERENCE TO RELATED APPLICATIONS

This application claims priority under 35 USC §119 to Finnish Patent Application No. 20035072 filed on May 22, 2003.

BACKGROUND OF THE INVENTION

The present invention relates to a method for connecting a memory component to an electronic device by a connection bus. The invention also relates to a system comprising an electronic device, a memory component connectable to the electronic device, and a connection bus for connecting the memory component to the electronic device. Further, the invention relates to an electronic device with a connection bus for connecting a memory component to the electronic device. Moreover, the invention relates to a connection bus to be used in an electronic device, for connecting a memory component to the electronic device.

In a number of electronic devices of prior art, in which e.g. a memory is used for data storage, the memory is implemented as an internal integrated memory. The electronic device is thus provided with a memory bus to which the memory is connected. The structure of the memory bus depends, inter alia, on the types of the memories connected to the memory bus. The memories to be connected to such a memory bus must thus be similar with respect to their way of connection. Consequently, the arrangement is fixed and dependent on the technology.

Electronic devices are known, to which it is possible to connect various peripheral devices, such as cards (interface cards, expansion cards), by which it is possible to change the facilities of the electronic device. For example, such a card can be used to provide a memory expansion for an electronic device, such as a computer, a wireless communication device, a personal digital assistant, etc. The electronic device is thus equipped with a peripheral device connection, such as a card connection, in which the peripheral device is placed. The peripheral device connection comprises a connection bus, through which data can be transferred between the electronic device and the interface card by using an interface protocol. Via the peripheral device connection, it is also possible to supply the card with the necessary operating voltages. The connection bus typically comprises a control bus, an address bus and/or a data bus. The control bus is used for the transmission of control information between the electronic device and the card. The address bus is used for the transmission of addresses to the card. The data bus, in turn, is intended for the transmission of information between the electronic device and the card. However, arrangements have been developed, in which one or several of said buses are combined at least partly. For example, some of the address data can be transmitted via the data bus. An example of such a card is the memory card complying with the MultiMediaCard™ specifications.

A problem in the systems of prior art is, for example, the fact that the same protocol is not necessarily used in all interface cards, wherein the electronic device should, in each case, be capable of determining the bus connection protocol supported by the interface card connected to the electronic device. For example, in bus arrangements of the NOR and NAND types, a technology-dependent protocol is used, wherein an interface card driver complying with this protocol must be implemented in the electronic device. Bus arrangements complying with different technologies cannot be mixed with each other, wherein a separate bus is required for each technology. However, a relatively massive bus connection protocol is used in implementations which are aimed at eliminating the dependency of the bus connection on the technology, that is, in which the internal implementation of the interface card is not manifested on the connection bus. This requires that a processor is used on the interface card to perform the functions required by the protocol.

SUMMARY OF THE INVENTION

It is an aim of the present invention to provide an improved bus connection which supports more than one interface protocol. The invention is based on the idea that the bus connection comprises means for implementing message transmission according to two or more protocols. To put it more precisely, the bus connection according to the present invention is primarily characterized in that at least a first interface protocol and a second interface protocol are available on the connection bus, wherein the memory component is recognized, the recognition is used to determine if said first interface protocol or said second interface protocol is available in the memory component, wherein the recognition is used to select one of the protocols available in the memory component, for use on the connection bus. The system according to the present invention is primarily characterized in that at least a first interface protocol and a second interface protocol are available on the connection bus, wherein the system comprises means for recognizing the memory component, determining means for using the recognition to determine the protocols available in the memory component, and selecting means for selecting one of the protocols available in the memory component to be used on the connection bus, on the basis of the recognition. The electronic device according to the present invention is primarily characterized in that at least a first interface protocol and a second interface protocol are available on the connection bus, wherein the electronic device comprises means for recognizing the memory component, determining means for using the recognition to determine the protocols available in the memory component, and selecting means for selecting one of the protocols available in the memory component to be used on the connection bus, on the basis of the recognition. The memory component according to the present invention is primarily characterized in that at least a first interface protocol and a second interface protocol are available on the connection bus, wherein the electronic device comprises means for recognizing the memory component, determining means for using the recognition to determine the protocols available in the memory component, and selecting means for selecting one of the protocols available in the memory component to be used on the connection bus, on the basis of the recognition.

Considerable advantages are achieved by the present invention. With the arrangement according to the invention, different internal or external memory components can be used in the same bus connection so that the technology implemented in the memory component does not need to be known by the electronic device, or so that the technology implemented in the memory component is taken into account in the electronic device, in the control of the bus and in data transmission between the electronic device and the memory component. The technology-dependent implementation has the advantage that no processor will be needed in the memory component, but a simpler control logic will be sufficient, which, inter alia, reduces the power consumption of the memory component and may also reduce the surface area required by the memory component. The technology-independent alternative, in turn, has e.g. the advantage that there is no need to implement a driver required by a given technology in the electronic device. The control of the bus and the data transmission are thus implemented by a protocol of a higher level. The invention has the significant advantage that the electronic device does not require different types of buses for different types of memory components, but the memory components of different types can be connected to the same bus. If necessary, this bus can be doubled or multiplied, wherein more memory components than one can be simultaneously connected to the bus. Also in this case, the bus connection is substantially similar.

Consequently, the arrangement of the invention combines the implementations of a conventional integrated technology-dependent memory system and a detachable technology-independent memory system in such a way that each implementation can be used on the same physical bus by the same method of initial recognition. This arrangement provides cost savings in the memory component when a technology-dependent driver is used. Furthermore, a technology-independent arrangement can also be used if it is not known in advance which technology is used in the detachable memory to be inserted later in the electronic device.

DESCRIPTION OF THE DRAWINGS

In the following, the invention will be described in more detail with reference to the appended drawings, in which.

DETAILED DESCRIPTION OF THE INVENTION

Figure 1:
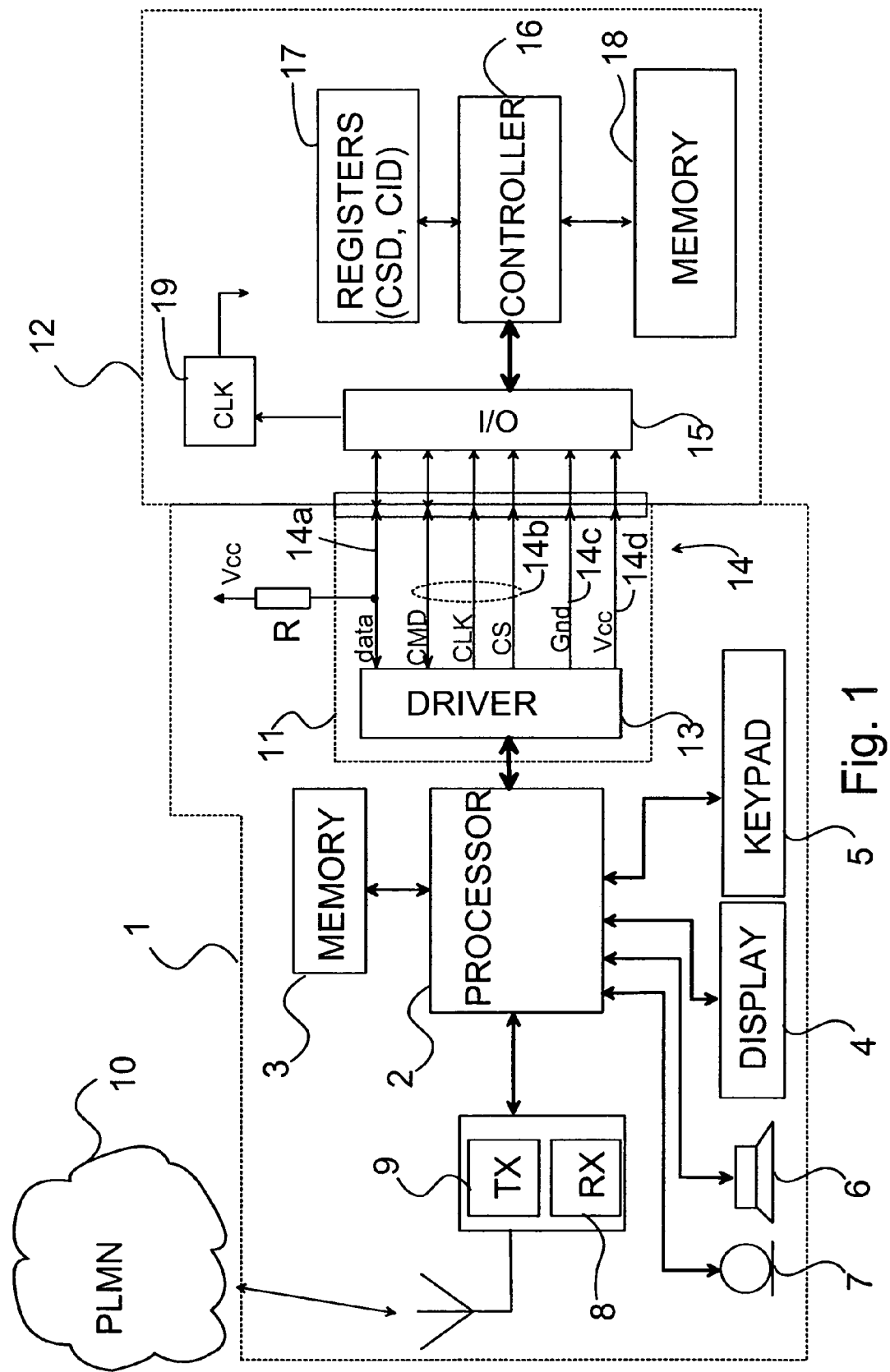
FIG. 1 shows an electronic device and a memory component according to a first advantageous embodiment of the invention in a reduced block diagram.

In the following description of an advantageous embodiment of the invention, the electronic device will be exemplified with a wireless terminal 1, but it should be evident that the invention is not limited to be used in such terminals only. Furthermore, a memory card is used as an example of the memory component. However, the invention is not limited to memory cards only. The terminal 1 comprises a processor 2, a memory 3, which may also comprise several different memory blocks, such as a read only memory (ROM) and a random access memory (RAM). Furthermore, a part of the memory can be a non-volatile memory, such as an EEPROM memory, in a way known as such. Also, the terminal preferably comprises a display 4, a keypad 5, and audio means, such as an earpiece and/or a speaker 6 and a microphone 7. Preferably, the terminal 1 also comprises communication means, such as a transmitter 9 and a receiver 8, for data transmission between the terminal 1 and a communication network 10. These communication means 8, 9 are preferably intended for wireless communication, wherein the communication network 10 comprises a wireless communication network, such as a mobile communication network, a wireless local area network, or the like. The terminal also comprises a memory component connection 11 for connecting one or more memory components 12 to the terminal 1.

Figure 2A:
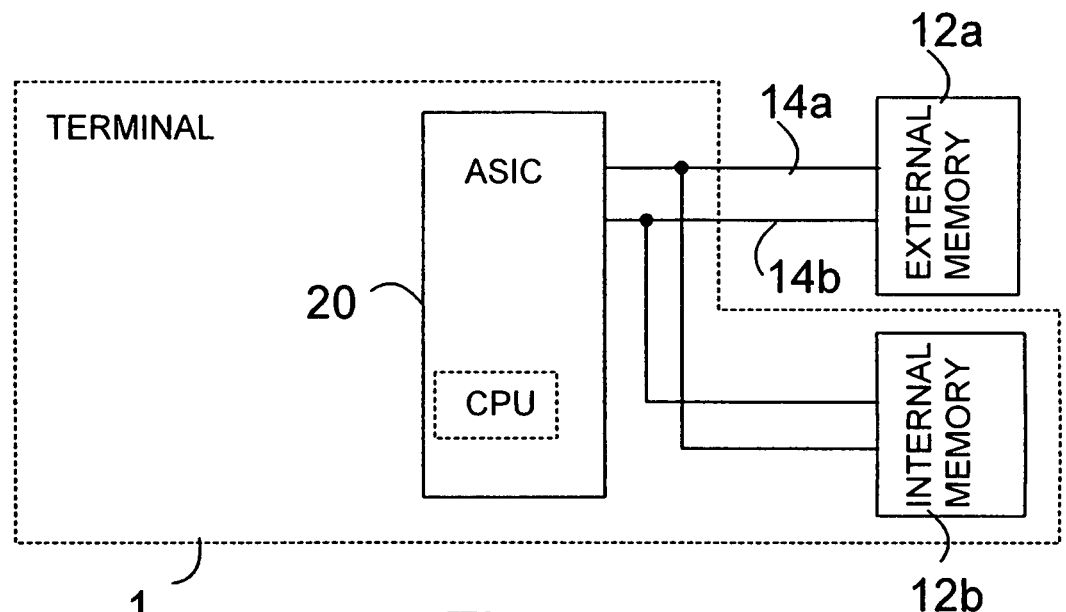
FIGS. 2a and 2b show a doubled bus connection between an electronic device and a memory component, implemented in two different ways.
Figure 2B:
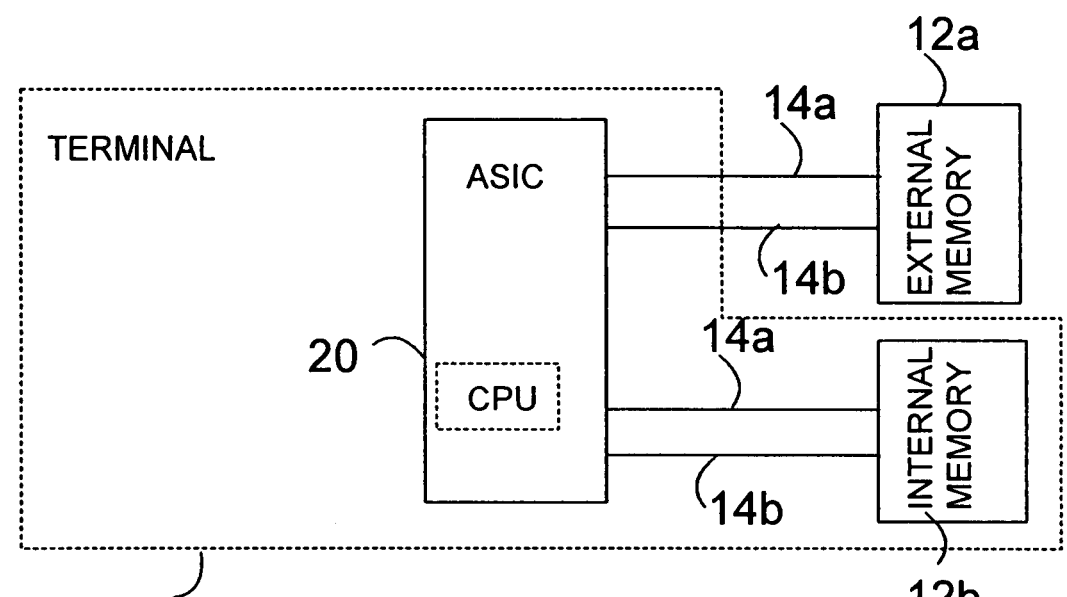

The memory component connection 11 preferably comprises a memory component driver 13 for controlling the functions necessary for using the memory component 12 connected to the memory component connection. Furthermore, the memory component connection is provided with a necessary connection bus, which preferably comprises a control bus 14b and a data bus 14a. The control bus 14b is used, for example, for the transfer of commands and responses between the memory component 12 and the terminal 1. The data bus 14a is intended for data transmission between the memory component 12 and the terminal 1. If more memory components than one can be simultaneously connected to the memory component connection 11, the memory component connection 11 is provided with several connectors (not shown), to which the buses 14a, 14b are coupled. In addition, the bus connection may comprise an internal bus and/or an external bus, as shown in FIGS. 2a and 2b.

The memory component driver 13 is not necessarily needed in all applications, wherein the processor 2 is responsible for the control of the connection bus.

In various applications, the memory component 12 to be connected to the terminal 1 may be very different, and the present invention is not limited to any specific memory component. Some non-restrictive examples to be mentioned of such memory components 12 include memory cards, such as a memory card complying with the specifications of a MultiMediaCard, or a memory card complying with the specifications of an SD Memory Card, communication cards, such as cards comprising mobile communication functions, etc. When various memory component types are used, the memory component connection 11 in the terminal may vary, but a person skilled in the art will be able to apply the invention in also other types of memory components and memory connections, on the basis of the following example applications. In the system according to an advantageous embodiment of the invention, shown in FIG. 1, the memory component is a memory card complying with the SD Memory Card specifications, and the data transfer between the memory component 12 and the memory component driver 13 of the terminal 1 is implemented in serial format according to the MultiMediaCard specifications. In this case, the control bus 14b and the data bus 14a of the memory component connection 11 are serial in format. Furthermore, the memory component connection typically comprises one or more ground lines 14c (Gnd) set in 0 potential, and one or more operating voltage lines 14d (Vcc). The control bus 14b preferably comprises a command line CMD, a clock line CLK, and a chip select line CS. Pull-up resistances R are preferably coupled to the lines of the data bus 14a, of which only one resistance is shown in FIG. 1 for clarity.

FIG. 1 also shows the internal structure of one such memory component 12 in a simplified block diagram. The memory component 12 comprises a bus connection block 15, via which the buses 14a, 14b are connected to the memory component 12. The memory component may also comprise a controller 16 for controlling the functions of the memory component 12. On the other hand, the invention also makes it possible to use such memory components which do not have a separate processor, in connection with the bus connection. The operation of these different types of memory components in the bus connection will be discussed in more detail below in this description. Preferably, the memory component 12 also comprises internal registers 17 for storing some data. Since the memory component 12 used here as an example is a memory card, the memory component 12 is also provided with a memory 18 which can be a read only memory and/or a random access memory. The memory 18 may comprise one or more memory types, such as a dynamic memory (DRAM), a static memory (SRAM), or a non-volatile memory (e.g. EEPROM, Flash). The memory 18 may also be implemented wholly or partly as a magnetic and/or optic memory, of which non-restrictive examples include a fixed disk, a CD-ROM, and a digital versatile disk. Furthermore, the memory component 12 may preferably comprise a clock circuit 19 for generating clock signals required in the operation of the different functional blocks of the memory component 12 in a way known as such.

Figure 3A:
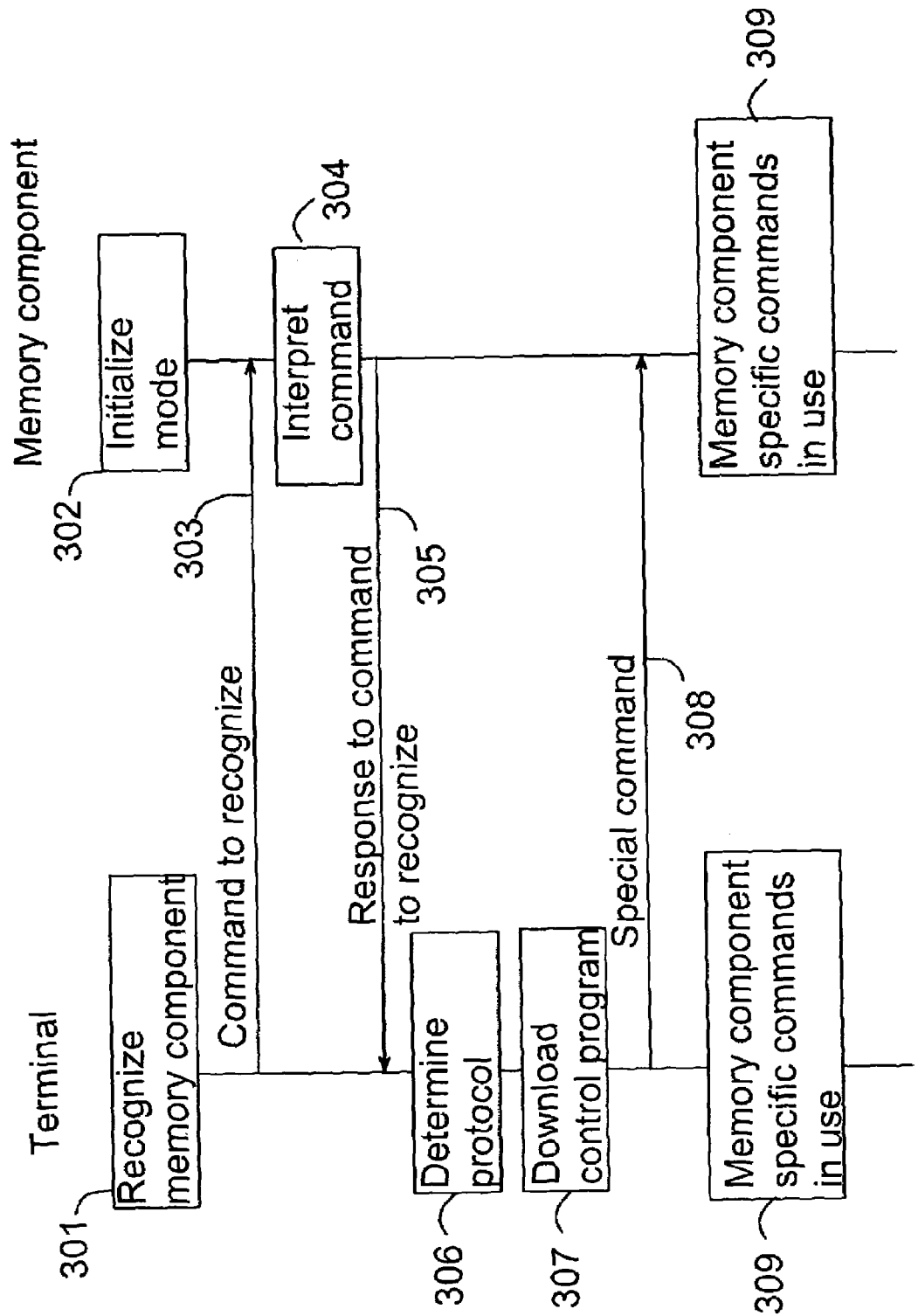
FIGS. 3a and 3b illustrate signalling between an electronic device and a memory component by means of memory components of different types.
Figure 3B:
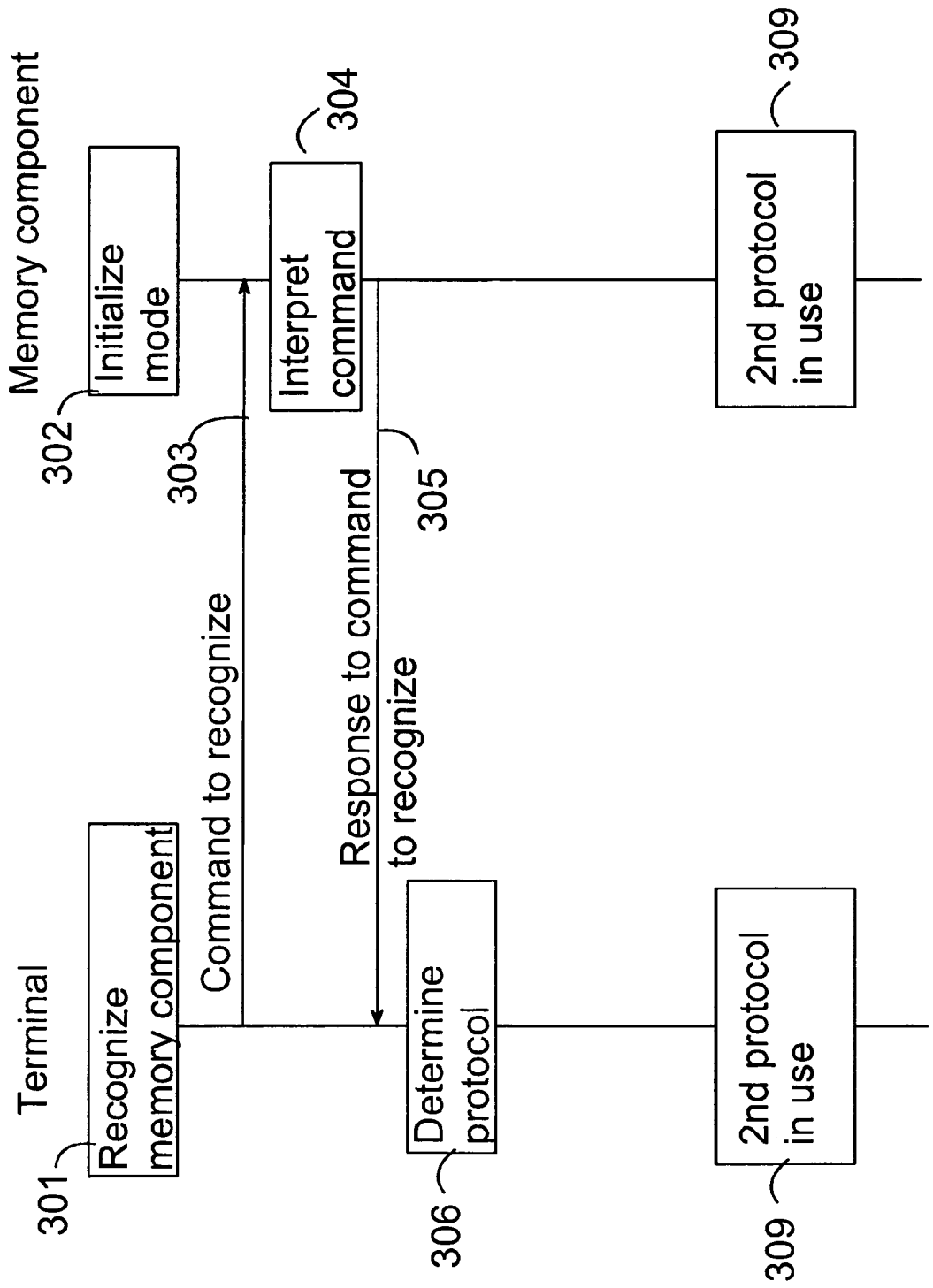

In the following, the operation of the method according to a preferred embodiment of the invention will be described with reference to the signalling charts of FIGS. 3a and 3b. In this context, it is assumed that two protocols have been defined, of which the first one is a protocol of a lower level, i.e., it only comprises a limited number of commands. The second protocol is a protocol of a higher level, comprising a more versatile set of commands than the first protocol. Furthermore, it is assumed that all the memory components 12 which use the interface bus recognize, from the commands of the first protocol, at least the commands relating to initialization. On the other hand, also an initialization protocol can be used for the initialization, wherein its commands must thus be recognized by the memory components 12. FIG. 3a shows signalling in a situation in which the memory component 12 does not support the second protocol. FIG. 3b, in turn, shows an example of a signalling chart between the terminal 1 and the memory component 12 when the second protocol is available in the memory component 12.

In the terminal 1, the steps 301 to initialize the bus connection are started, whereby the bus connection is started to operate with said first protocol (or initialization protocol, if one has been defined). In the protocol used for initialization, some functions are defined, by means of which commands can be sent to the memory component and responses can be received from the memory component. The initialization steps can be taken, for example, by program commands implemented in the memory component driver 13 or in the processor 2. If necessary, the memory component 12 can also be used to take initialization steps 302 to start the operation of the memory component e.g. with respect to the bus connection. So that the communication between the memory component and the terminal would be implemented by using the correct protocol, the type or other data of the memory component 12 must first be recognized, to determine the protocol supported by the memory component 12. The type of the memory component 12 can be recognized, for example, by setting, in the first protocol, a command which the memory component 12 must recognize, irrespective of the protocol level supported by the memory component. Thus, this command is transmitted 303 from the terminal 1 via the control bus 14b of the bus connection to the memory component 12. When in working condition, the memory component 12 interprets 304 the received command and transmits 305, either on the control bus 14b or on the data bus 14a, a response, on the basis of which the protocol supported by the memory component can be determined. However, it is possible that the memory component is recognized so that the memory component 12 sets one or more detecting lines (not shown) in a state which is detected by the processor 2 of the terminal or the memory component driver 13, to determine the type of the memory component.

After the protocol supported by the memory component 12 has been determined 306, the operation can be continued according to this protocol. If said second protocol is available in the memory component 12, the memory component 12 thus normally has a separate controller 16 to receive and interpret the commands, to send responses and to take the steps complying with the commands in the memory component 12, such as to store data in the memory 18 and to read data from the memory 18. In this case, the terminal 1 does not need to have any information about the technology used in the memory component 12, because the second protocol is substantially a technology-independent protocol. This makes it possible to use several different types of memory components 12 in connection with the terminal 1. Moreover, the terminal 1 does not require any memory-component-specific driver software, or the like. Consequently, the connection format is one that hides the technology. Furthermore, the functions included in the second protocol may be more versatile than the functions of the first protocol.

In a situation in which the memory component 12 does not support the second protocol, the steps complying with the first protocol are taken after the initialization. In this case, if necessary, the terminal 1 determines the technology used in the memory component 12, for a more detailed determination of the signalling to be used in the bus connection. In a way known as such, the technology may be, for example, NAND or NOR technology, wherein the bus protocol is adapted to comply with the function of the NAND protocol or the NOR protocol. Consequently, the connection format is dependent on the technology. On the basis of the type of the memory component 12, a driver program corresponding to the type is downloaded 307, for example from a memory, to the software memory (not shown) of the processor 2 or the memory component driver 13. After this, the running of this driver program is started. The steps required for using the bus complying with the type are implemented in the driver program. In this arrangement, the memory component 12 does not need to comprise a controller of its own, but the interpretation of the commands and the processing of the functions corresponding to them can be preferably implemented as relatively simple logic functions in the memory component 12. To start data transmission, e.g. a given special command is transmitted 308 to the memory component 12, for example a switch command (#6) presented in the MMCA protocol specifications. This command sets the communication between the memory component 12 and the terminal 1 to be implemented by commands 309 complying with the memory component and/or the application. In the transmission of these commands, certain messages complying with the first protocol are used, from which the memory component 12 is capable of decrypting the transmitted command.

If necessary, also more memory components than one can be simultaneously connected to the bus connection according to the invention, as shown in FIGS. 2a and 2b. Furthermore, the memory components can be of different types; that is, both the first and the second protocol can be used simultaneously on the connection bus. For the sake of clarity, FIGS. 2a and 2b do not show all the functional blocks of the terminal 1 but primarily the blocks which are essential in illustrating the principle of doubling the bus connection.

In the electronic device according to an advantageous embodiment of the invention, shown in FIG. 2a, the doubling is implemented by dividing the bus connection in two parts. Thus the control bus 14b and the data bus 14a are branched into two (or more) parallel buses. It is thus possible to connect one memory component 12 to each branch. In the example of FIG. 2a, the control and data buses of one branch are intended for connecting external memory components 12a, and the control and data buses of the other branch are intended for connecting an internal memory component 12b.

In the embodiment of FIG. 2b, the doubling is implemented in an application specific integrated circuit (ASIC) 20 comprising a memory component driver. In this alternative, the signals are divided to two (or more) different bus connections within the circuit. Also in this example of FIG. 2b, one bus connection is intended for an external memory component 12a and the other bus connection for an internal memory component 12b.

In the embodiments of FIGS. 2a and 2b, it has been explained as an example that the application specific integrated circuit 20 also comprises a processor 2 (CPU) and a memory component driver 13. However, it will be evident that they can also be separate circuits.

Using the bus connection according to the invention, it is possible to provide a flexible method for using various memory components 12 in connection with a terminal 1. For example, the internal memory component 12b may be a mass storage, such as a fixed disk, a FLASH memory, or the like. Thus, the driver program(s) required for controlling the mass storage with the first protocol are preferably installed in the terminal 1 at the manufacturing stage, wherein e.g. circuit board area is saved in the terminal 1. The external memory component may also be a memory component, which can be used e.g. to load new applications into the terminal, to increase the memory capacity of the terminal 1, etc. In spite of the different types of memories, the same bus connection can be used.

The driver programs required by the memory components 12 using the first protocol are preferably stored in the terminal 1 at the stage of manufacture of the terminal, wherein the memory component types to be supported are selected at the manufacturing stage. On the other hand, in some cases it is possible to update the application software of the terminal 1, including the driver programs, later on e.g. via the communication means 8, 9 or via the memory component connection 11, wherein the number of memory component types to be supported can be increased.

In the above description of the invention, the term memory component 12, 12a, 12b refers to such functional units which can be connected to the terminal by the connection bus 14. However, it will be obvious that the mechanical implementation of the memory component 12, 12a, 12b can be detachable or integrated.

The present invention is not limited solely to the above-presented embodiments, but it can be modified within the scope of the appended claims.

The invention claimed is:

1. A method for connecting a memory component to an electronic device by a connection bus, wherein at least a first interface protocol and a second interface protocol are available on the connection bus, wherein the method comprises:
the electronic device transmitting a recognition command to the memory component using an initialization protocol common to memory components capable of using the connection bus and then receiving a response to the recognition command back from the memory component using the initialization protocol, the electronic device recognizing the memory component based on said response,
using a recognition of the memory component to determine if said first interface protocol or said second interface protocol are available in the memory component, and
selecting, on the basis of the recognition of the memory component, one of the first interface protocol or the second interface protocol available in the memory component to be used on the connection bus, wherein said second interface protocol is selected if it is available in the memory component, and wherein, otherwise, said first interface protocol is selected, and
wherein said first interface protocol is memory-technology-dependent and said second interface protocol is memory-technology-independent.

2. The method according to claim 1, wherein the first interface protocol has a limited number of commands as compared to said second interface protocol which has a more versatile set of commands than the first interface protocol.

3. The method according to claim 1, wherein said first interface protocol includes said initialization protocol.

4. A method for connecting a memory component to an electronic device by a connection bus, wherein at least a first interface protocol and a second interface protocol are available on the connection bus, wherein the method comprises:
recognizing the memory component using at least an initialization protocol that is part of said first interface protocol, and which is common to memory components capable of using the connection bus,
using a recognition of the memory component to determine if said first interface protocol or said second interface protocol are available in the memory component, and
selecting, on the basis of the recognition of the memory component, one of the first interface protocol or the second interface protocol available in the memory component to be used on the connection bus, wherein said second interface protocol is selected if it is available in the memory component, and wherein, otherwise, said first interface protocol is selected, and
wherein said first interface protocol is memory-technology-dependent and said second interface protocol is memory-technology-independent.

5. The method according to claim 1 wherein said first protocol comprises a command relating to interface protocol change, wherein if, on the basis of the recognition of the memory component, it has been determined that the second interface protocol is available in the memory component, the interface protocol is changed to comply with the second interface protocol by transferring said command relating to interface protocol change to the memory component.

6. The method according to claim 1 wherein if, on the basis of the recognition of the memory component, it has been determined that said second interface protocol is not available in the memory component, a memory technology used in the memory component is determined, wherein signaling on the connection bus is set to comply with the determined memory technology.

7. A system comprising an electronic device, a memory component connectable to the electronic device, and a connection bus to connect the memory component to the electronic device, wherein at least a first interface protocol and a second interface protocol are available on the connection bus, wherein the system comprises:
a driver to transmit a recognition command from the electronic device to the memory component that then is to transmit a response to the recognition command back to the electronic device, wherein the recognition command and the response are common to memory components capable of using the connection bus,
a recognition device to recognize the memory component,
a determining device to use a recognition of the memory component to determine if said first interface protocol and said second interface protocol are available in the memory component, and
a selecting device to select, on the basis of the recognition of the memory component, one of the first interface protocol or the second interface protocol determined to be available in the memory component to be used on the connection bus, wherein said second interface protocol is to be selected if it is available in the memory component, and wherein, otherwise, said first interface protocol is to be selected, and wherein said first interface protocol is memory-technology-dependent and said second interface protocol is memory-technology-independent.

8. An electronic device comprising a connection bus to connect a memory component to the electronic device, wherein at least a first interface protocol and a second interface protocol are available on the connection bus, wherein the electronic device also comprises:
  a driver to transmit a recognition command from the electronic device to the memory component and to then receive a response to the recognition command back from the memory component, wherein the recognition command and the response are common to memory components capable of using the connection bus,
  a recognition device to recognize the memory component,
  a determining device to use a recognition of the memory component to determine if the first interface protocol or the second interface protocol are available in the memory component, and
  a selecting device to select, on the basis of the recognition of the memory component, a determined one of the first interface protocol or the second interface protocol available in the memory component to be used on the connection bus, wherein said second interface protocol is to be selected if it is available in the memory component, and wherein, otherwise, said first interface protocol is to be selected, and
  wherein said first interface protocol is memory-technology-dependent and said second interface protocol is memory-technology-independent.

9. The electronic device according to claim 8, wherein the first interface protocol has a limited number of commands as compared to the second interface protocol which has a more versatile set of commands than the first interface protocol.

10. An electronic device comprising a connection bus to connect a memory component to the electronic device, wherein at least a first interface protocol and a second interface protocol are available on the connection bus, wherein the electronic device also comprises:
  a recognition device to recognize the memory component using an initialization protocol included as part of said first interface protocol, and which is common to memory components capable of using the connection bus,
  a determining device to use a recognition of the memory component to determine if said first interface protocol or said second interface protocol are available in the memory component, and
  a selecting device to select, on the basis of the recognition of the memory component, one of the first interface protocol or the second interface protocol determined to be available in the memory component to be used on the connection bus, wherein said second interface protocol is to be selected if it is available in the memory component, and wherein, otherwise, said first interface protocol is to be selected, and
  wherein said first interface protocol is memory-technology-dependent and said second interface protocol is memory-technology-independent.

11. An electronic device comprising:
  means for connecting a memory component to the electronic device, wherein at least a first interface protocol and a second interface protocol are available on the means for connecting,
  means for transmitting a recognition command from the electronic device to the memory component and for receiving a response to the recognition command back from the memory component, wherein the recognition command and the response are common to memory components capable of using the connection bus and are including in said first interface protocol,
  recognition means for recognizing the memory component,
  determining means for using a recognition of the memory component to determine if said first interface protocol or said second interface protocol is available in the memory component, and
  selecting means for selecting, on the basis of the recognition of the memory component, a determined one of the first interface protocol or the second interface protocol available in the memory component to be used on the connection bus, wherein said second interface protocol is to be selected if it is available in the memory component, and wherein, otherwise, said first interface protocol is to be selected, and
  wherein said first interface protocol is memory-technology-dependent and said second interface protocol is memory-technology-independent.

12. The system according to claim 7, wherein said first interface protocol comprises the recognition command and the response.

13. The electronic device according to claim 8, wherein said first interface protocol comprises the recognition command and the response.

14. The electronic device according to claim 10, wherein said first interface protocol comprises at least one command relating to initialization of memory components, and wherein the interface protocol available in the memory component is able to interpret said at least one command relating to initialization.

15. The method according to claim 4, wherein said first interface protocol comprises at least one command relating to initialization of memory components, and wherein the interface protocol available in the memory component is able to interpret said at least one command relating to initialization.

16. The electronic device according to claim 11, wherein said first interface protocol comprises at least one command relating to initialization of memory components, and wherein the interface protocol available in the memory component is able to interpret said at least one command relating to initialization.

17. The method according to claim 1, wherein said first interface protocol is dependent on a logic type of the memory component.

18. The method according to claim 4, wherein said first interface protocol is dependent on a logic type of the memory component.

19. The system according to claim 7, wherein said first interface protocol is dependent on a logic type of the memory component.

20. The device according to claim 8, wherein said first interface protocol is dependent on a logic type of the memory component.

21. The device according to claim 10, wherein said first interface protocol is dependent on a logic type of the memory component.

22. The device according to claim 11, wherein said first interface protocol is dependent on a logic type of the memory component.

* * * * *